United States Patent
Wallick et al.

(10) Patent No.: US 11,390,060 B2
(45) Date of Patent: Jul. 19, 2022

(54) SURFACE TREATMENT TO ENHANCE BONDING OF COMPOSITE MATERIALS

(71) Applicant: Cytec Industries Inc., Princeton, NJ (US)

(72) Inventors: Jessica L. Wallick, North East, MD (US); Leonard A. MacAdams, Woolwich Township, NJ (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 389 days.

(21) Appl. No.: 16/723,357

(22) Filed: Dec. 20, 2019

(65) Prior Publication Data

US 2020/0198313 A1 Jun. 25, 2020

Related U.S. Application Data

(60) Provisional application No. 62/782,559, filed on Dec. 20, 2018.

(51) Int. Cl.
*B32B 37/12* (2006.01)
*B32B 37/24* (2006.01)
(Continued)

(52) U.S. Cl.
CPC .... *B32B 37/0038* (2013.01); *B29C 66/73755* (2013.01); *B32B 5/024* (2013.01);
(Continued)

(58) Field of Classification Search
CPC ............ B29C 37/0025; B29C 37/0028; B29C 2037/0042; B29C 65/02; B29C 65/4835; B29C 65/486; B29C 65/5021; B29C 65/5028; B29C 65/5057; B29C 66/02; B29C 66/02245; B29C 66/026; B29C 66/1122; B29C 66/45; B29C 66/71; B29C 66/721; B29C 66/73751; B29C 66/73752; B29C 66/73753; B29C 66/73754; B29C 66/73755; B29C 66/73941; B29C 70/683; B29K 2063/00; B32B 5/024; B32B 7/12; B32B 27/38; B32B 37/0038; B32B 37/24; B32B 2037/1253; B32B 2037/243; B32B 38/0036; B32B 2255/26; B32B 2305/72;
(Continued)

(56) References Cited

U.S. PATENT DOCUMENTS 9,473,459 B2 * 10/2016 Zhao .................... G06F 9/45529
9,636,867 B2 * 5/2017 MacAdams ......... B29C 66/7394
(Continued)

FOREIGN PATENT DOCUMENTS

WO   WO-2018049099 A1 *  3/2018  ......... B29C 65/4835

*Primary Examiner* — Michael A Tolin
(74) *Attorney, Agent, or Firm* — Thi Dang

(57) ABSTRACT

A method for surface preparation of composite substrates prior to adhesive bonding. A curable surface treatment layer containing blocked isocyanate compounds is applied onto a curable composite substrate, followed by co-curing. The surface treatment layer may be a resin layer without fibers or a removal peel ply composed of resin-impregnated fabric. After surface preparation, the composite substrate is provided with a chemically-active, bondable surface that can be adhesively bonded to another composite substrate to form a covalently-bonded structure.

20 Claims, 2 Drawing Sheets

(51) Int. Cl.
  *B32B 5/02* (2006.01)
  *B32B 7/12* (2006.01)
  *C09J 5/02* (2006.01)
  *B29C 65/00* (2006.01)
  *B32B 37/00* (2006.01)
  *B32B 27/38* (2006.01)
  *B32B 38/00* (2006.01)

(52) U.S. Cl.
  CPC ............... *B32B 7/12* (2013.01); *B32B 27/38* (2013.01); *B32B 37/24* (2013.01); *B32B 38/0036* (2013.01); *C09J 5/02* (2013.01); B32B 2037/1253 (2013.01); B32B 2037/243 (2013.01); B32B 2255/26 (2013.01); B32B 2305/72 (2013.01); C09J 2463/006 (2013.01); C09J 2463/008 (2013.01); C09J 2475/003 (2013.01)

(58) Field of Classification Search
  CPC .... B32B 2305/74; B32B 2305/77; C08J 7/04; C08J 7/043; C09J 5/02; C09J 2463/006; C09J 2463/008; C09J 2475/003
  See application file for complete search history.

(56) References Cited

U.S. PATENT DOCUMENTS

| | | |
|---|---|---|
| 9,789,646 B2 * | 10/2017 | MacAdams ......... B29C 66/0224 |
| 2010/0151138 A1 | 6/2010 | Occhiello et al. |
| 2013/0045652 A1 | 2/2013 | Schmidt et al. |
| 2017/0166687 A1 | 6/2017 | Ortelt et al. |
| 2019/0291355 A1 * | 9/2019 | Blanc ........................ C09J 7/38 |

* cited by examiner

SURFACE TREATMENT TO ENHANCE BONDING OF COMPOSITE MATERIALS

The instant application claims the benefit of prior U.S. Provisional Application No. 62/782,559 filed on Dec. 20, 2018, the content of which is incorporated herein by reference in its entirety.

DETAILED DESCRIPTION

Figure 1:
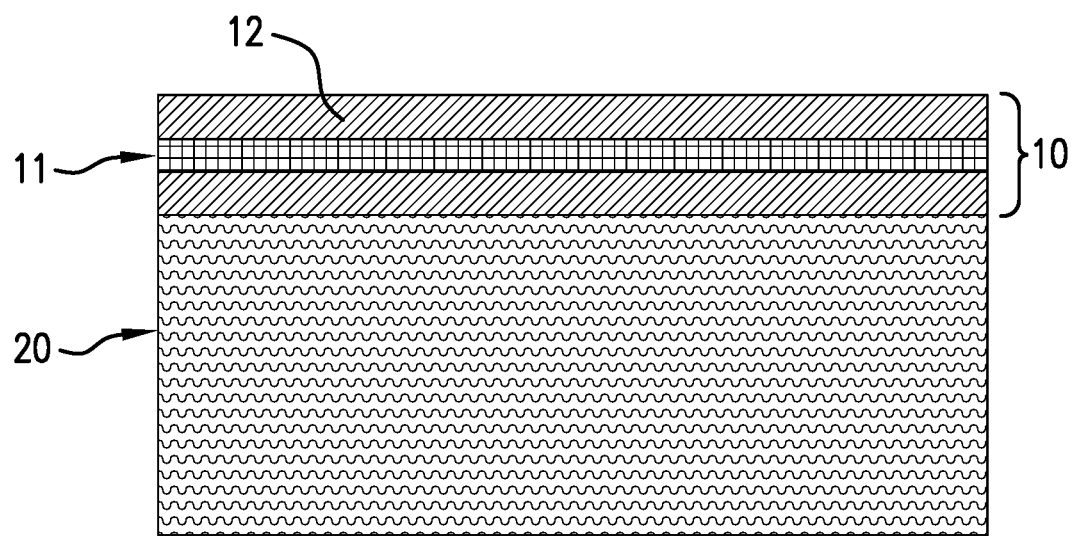
FIG. 1 schematically illustrates a composite substrate having a peel ply, according to one embodiment of the present disclosure.

Adhesive bonding has been conventionally used as a method for joining composite structures, such as those used in the aerospace industry. Currently, adhesive bonding of composite structures is carried out predominantly by one of three ways: (1) co-curing, (2) co-bonding, and (3) secondary bonding.

"Co-curing" involves joining uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials are difficult to handle. For example, it is difficult to assemble and bond uncured composite materials on tools with complex three-dimensional shapes.

"Co-bonding" involves joining a pre-cured composite part to an uncured composite part by adhesive bonding, wherein the adhesive and the uncured composite part are being cured during bonding. The pre-cured composite usually requires an additional surface preparation step prior to adhesive bonding.

"Secondary bonding" is the joining together of pre-cured composite parts by adhesive bonding, wherein only the adhesive is being cured. This bonding method typically requires surface preparation of each previously cured composite part at the bonding surfaces.

Proper surface treatment for co-bonding and secondary bonding is a prerequisite to achieve the highest level of bond line integrity in adhesively bonded structures. Bond line integrity, generally, refers to the overall quality and robustness of the bonded interface. Conventional co-bonding and secondary bonding processes typically include a surface treatment of the composite structures pursuant to the manufacturer's specifications prior to adhesive bonding. Surface treatments include, but are not limited to grit blasting, sanding, peel ply, priming, etc. These surface treatment methods improve adhesion predominantly by mechanical roughening of the surface. The roughened surface allows for better adhesion due to mechanical interlocking at the bonding interface. Such co-bonding or secondary bonding of pre-cured composite structures has a limitation in that the bonding mechanism occurs only through mechanical interlocking with no formation of chemical bonds as in co-cure bonding. Such surface treatments, if performed improperly, could become a source of bond failure during the use of the final bonded structure. Furthermore, in the absence of chemical bond formation at the interface of a composite bonded assembly, the assessment of bond line quality is critical to ensure that proper bonding has occurred. Unfortunately, assessment of bond line quality is often difficult and current techniques known in the art to measure bond line quality are not well suited to measure and evaluate all potential sources of weak bonds.

In the aerospace industry, adhesives are typically used in combination with mechanical fasteners (e.g. rivets, screws, and bolts) to safely and reliably secure structural materials. Rarely are structural adhesives used as the sole mechanism for joining structural parts in an aircraft. Some of the benefits provided by adhesively bonded parts include lighter weight, reduced stress concentrations, durability, lower part count, etc. However, the challenge with replacing the use of fasteners and rivets in the aerospace industry is the ability to achieve aviation certification such as that from the Federal Aviation Administration (FAA) in the United States. Such certification requires proving that the bonding between structures is reliable and provides structural redundancy. One way to ensure reliability and redundancy is through the use of covalent chemical bonding and co-cured structures.

A surface preparation method is disclosed herein that enables the creation of a chemically-active surface on a composite substrate. Such chemically-active surface enables chemical bonding to another substrate via the use of a thermoset resin-based adhesive. The chemically-active surface is created by using a curable surface treatment layer that can be placed on a fiber-reinforced resin substrate (or composite substrate). This bonding method creates a chemical bond between the composite surface and the adhesive, resulting in a stronger bond between substrates.

According to one embodiment, a surface treatment layer, which is a curable resin layer without any reinforcement fibers, is placed on a composite substrate. The composite substrate is composed of reinforcement fibers infused or impregnated with an uncured or curable matrix resin. The curable surface treatment layer is formed from a curable thermoset resin composition containing one or more epoxy resins and a blocked isocyanate, which functions as a latent curing agent. In an initial curing stage, co-curing of the surface treatment layer and the composite substrate is carried out at a first cure temperature for a time period sufficient for some, but not all, of the blocked isocyanate compounds within the surface treatment layer to become de-blocked, thereby releasing free isocyanate groups —N=C=O that can react with epoxy groups. In some embodiments, the initial curing stage may be carried out in the temperature range of 212° F. to 356° F. (or 100° C. to 180° C.) for the duration of 30 minutes to 4 hours, and in other embodiments, 275° F. to 350° F. (or 135° C. to 176° C.), for the duration of 1 hour to 3 hours. The free isocyanate groups react with the epoxy groups in the surface treatment layer as well as the epoxy groups in the adjacent composite substrate. In this way, covalent bonding is established at the interface between the surface treatment layer and the composite substrate after co-curing. After the initial curing stage, the surface treatment layer is not fully cured but the composite substrate may be fully cured or more than 50% degree of cure. The remaining blocked isocyanate compounds within the surface treatment layer can become un-blocked during a subsequent co-curing with a curable adhesive used for bonding. As a result, after initial co-curing, the composite substrate has a bondable surface that is ready for adhesive bonding with another substrate.

The degree of cure of a thermoset resin system can be determined by Differential Scanning Calorimetry (DSC). A thermoset resin system undergoes an irreversible chemical reaction during curing. As the components in the resin system cure, heat is evolved by the resin, which is monitored by the DSC instrument. The heat of cure may be used to determine the percent cure of the resin material. As an example, the following simple calculation can provide this information:

% Cure=$[\Delta H_{uncured} - \Delta H_{cured}]/[\Delta H_{uncured}] \times 100\%$ where $\Delta H$ is the enthalpy generated by the uncured or cured sample.

In an alternative embodiment, the curable surface treatment layer is in the form of a removal peel ply, which is composed of a woven fabric infused or impregnated with the curable thermoset resin composition containing a blocked isocyanate as described above. The peel ply has a resin content of at least 20% by weight based on the total weight of the peel ply, depending on the specific type of fabric being impregnated. In certain embodiments, the resin content is within the range of about 20% to about 80% by weight, or about 20% to about 50% by weight. The fabric may be composed of glass, nylon, or polyester fibers, although other types of fabrics are contemplated herein.

Figure 2:
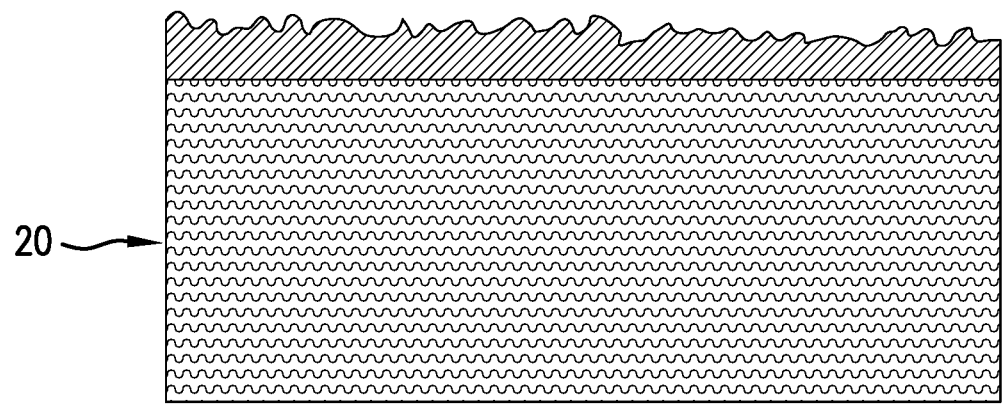
FIG. 2 schematically illustrates the composite substrate of FIG. 1 after the peel ply is removed.

Referring to FIG. 1, a curable peel ply 10 is first laminated onto an outermost surface of a curable composite substrate 20. The peel ply 10 is composed of a woven fabric 11 infused or impregnated with a curable thermoset resin 12 containing a blocked isocyanate. The curable composite substrate 20 is composed of reinforcement fibers infused or impregnated with an uncured or curable matrix resin, which contain one or more thermoset resins. Next, co-curing of the peel ply 10 and the composite substrate 20 is carried out in an initial curing stage in which some of the blocked isocyanate compounds within the peel ply resin 12 become un-blocked as described above. After co-curing, the peel ply (including the fabric therein) is peeled off as shown in FIG. 2, leaving behind a remaining film of partially cured thermoset material on the composite substrate 20. The remaining film has a rough outer surface and contains blocked isocyanate compounds that can become un-blocked during a subsequent curing stage. Consequently, after peel ply removal, the resulting composite substrate has a bondable surface that is ready for adhesive bonding with another substrate.

Figure 3:
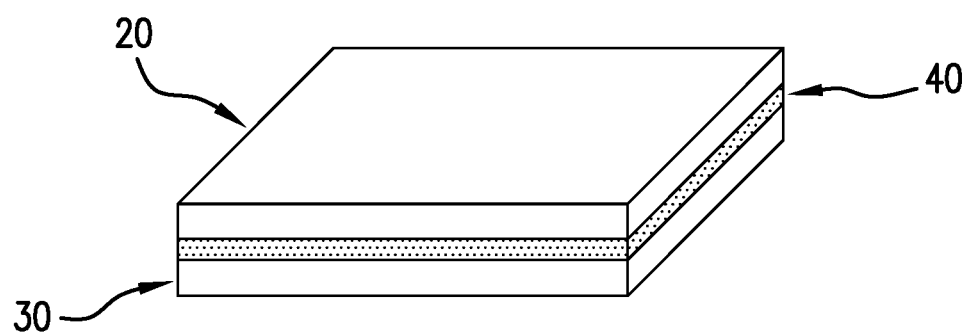
FIG. 3 illustrates adhesive bonding of two composite substrates after surface treatment.

Referring to FIG. 3, the surface treated composite substrate 20, having a bondable surface layer containing blocked isocyanate compounds, can be joined to a second composite substrate 30 with a curable, epoxy-based adhesive film 40 sandwiched in between the substrates. The adhesive is in contact with the bondable surface layer containing blocked isocyanate compounds. Next, in a second curing phase, the joined substrates are exposed to heating at a second cure temperature for a time period sufficient for unblocking the remaining blocked isocyanate compounds in the surface layer of substrate 20 and to fully cure the adhesive. The second cure temperature may be the same as or higher than the first cure temperature of the initial curing phase. In some embodiments, the second cure temperature is higher than the first cure temperature and is in the range of 325° F. to 365° F. (or 162° C. to 185° C.). The duration of the second curing phase may be in the range of 1 to 3 hours. The epoxide groups in the epoxy-based adhesive film 40 react with the unblocked isocyanate compounds during curing to affect chemical or covalent bonding.

The second composite substrate may be a cured composite substrate that has been subjected to the same surface preparation as described for the first composite substrate so as to form a counterpart bonding surface with block isocyanate. The joined composite substrates are then subjected to heat treatment at elevated temperature(s) to cure the adhesive, resulting in a covalently bonded structure—this is referred to as secondary bonding. The adhesive film 40 may be applied to either or both of the bondable surfaces of the first and second composite substrates.

Alternatively, the bondable surface of the second composite substrate 30 may be prepared by other known surface treatments such as sand blasting, grit blasting, dry peel ply surface preparation, etc. "Dry peel ply" is a dry, woven fabric (without resin), usually made out of nylon, glass, or polyester, which is applied to the bonding surface of the composite substrate followed by curing. After curing, the dry peel ply is removed to reveal a textured bonding surface.

In an alternative embodiment, the second composite substrate 30 is in an uncured state when it is joined to the first cured composite substrate 20. In such case, the uncured composite substrate 30 and the curable adhesive film 40 are cured simultaneously in a subsequent heating step—this is referred to as co-bonding.

The terms "cure" and "curing" as used herein encompass polymerizing and/or cross-linking of a polymeric material brought about by mixing of based components, heating at elevated temperatures, exposure to ultraviolet light and radiation. "Fully cured" as used herein refers to 100% degree of cure. "Partially cured" as used herein refers to less than 100% degree of cure.

Blocked Isocyanate

Blocked isocyanates are materials in which the isocyanate functionality is blocked at room temperature (20° C.-25° C.) by a blocking agent and are consequently non-reactive. At elevated temperatures, for example, 100° C. or higher, the isocyanates become unblocked and are free to react with other chemical functionality, as depicted by the reaction below:

BH - Blocking agent

Blocked polyisocyanate compounds may include, for example, polyisocyanates having at least two free isocyanate groups per molecule, where the isocyanate groups are blocked with an isocyanate blocking agent. The blocked isocyanate may be prepared by reaction of an isocyanate compound and a blocking agent by a conventional method.

Isocyanates for the purposes herein include diisocyanates with the general formula OCN—R—NCO and polyisocyanates with the generic formula $C_3N_3O_3R_3$ (isocyanurates) and $C_2N_2O_2R_2$ (uretdiones), where R is selected from toluene, diphenylmethane, xylene, paraphenylene, hexamethylene, isophorone, bis(4-isocyanatocyclohexyl) methane, hydrogenated xylene, m-tetramethyxylylene or derivatives of any of the above with higher functionality. Generally, any of the known aliphatic, alicyclic, cycloaliphatic, and aromatic di- and/or polyisocyanates would be suitable.

Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis (cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate, and 1,2-cyclohexane diisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis(4-phenylisocyanate), and the like, and biuret type adducts and isocyanurate ring adducts of these polyisocyanates. Polyisocyanates having three or more isocyanate groups per molecule may include, for example, triphenylmethane-4,4',4"-triisocyanate, 1,3,5-triisocyanato-benzene, 2,4,6-triisocyanatotoluene, 4,4'-dimethyldiphenylmethane-2,2',5,5'-tetraisocyanate.

Other isocyanate compounds may include tetramethylene diisocyanate, toluene diisocyanate, hydrogenated di phenyl methane diisocyanate, hydrogenated xylylene diisocyanate.

Other useful polyisocyanates include, but are not limited to 1,2-ethylenediisocyanate, 2,2,4- and 2,4,4-trimethyl-1,6-hexamethylenediisocyanate, 1,12-dodecandiisocyanate, omega, omega-diisocyanatodipropylether, cyclobutan-1,3-diisocyanate, cyclohexan-1,3- and 1,4-diisocyanate, 2,4- and 2,6-diisocyanato-1-methylcylcohexane, 3-isocyanatomethyl-3,5,5-trimethylcyclohexylisocyanate ("isophoronediisocyanate"), 2,5- and 3,5-bis-(isocyanatomethyl)-8-methyl-1,4-methano, decahydronaphthathalin, 1,5-, 2,5-, 1,6- and 2,6-bis-(isocyanatomethyl)-4,7-methanohexahydroindan, 1,5-, 2,5-, 1,6- and 2,6-bis-(isocyanato)-4,7-methanohexahydroindan, dicyclohexyl-2,4'- and -4,4'-diisocyanate, omega, omega-diisocyanato-1,4-diethylbenzene, 1,3- and 1,4-phenylenediisocyanate, 4,4'-diisocyanatodiphenyl, 4,4'-diisocyanato-3,3'-dichlorodiphenyl, 4,4'-diisocyanato-3,3'methoxy-diphenyl, 4,4'-diisocyanato-3,3'-diphenyl-diphenyl, naphthalene-1,5-diisocyanate, N—N'-(4,4'-dimethyl-3,3'-diisocyanatodiphenyl)-uretdion, 2,4,4'-triisocyanatanodiphenylether, 4,4',4"-triisocyanatotriphenylmethant, and tris(4-isocyanatophenyl)-thiophosphate.

Isocyanate blocking agents may include malonates, triazoles, imidazoles, pyrazoles, phenols, lactams, oximes, mercaptans, and aromatic amines.

Suitable malonates include diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; methyl trimethylsilyl malonate, ethyl trimethylsilyl malonate, bis(trimethylsilyl) malonate, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloromalonate.

Triazoles blocking agents may include 1,2,4-triazole, 1,2,3-benzotriazole, 1,2,3-tolyl triazole and 4,5-diphenyl-1,2,3-triazole. Imidazole blocking agents may include imidazole, 2-ethylimidazole and the like. Imine blocking agents may include ethyleneimine, propyleneimine and the like. Pyrazoles include 1,2-pyrazole, 2-methyl-4-ethyl-5-methylpyrazole, and dimethylpyrazole.

Phenolic blocking agent may include phenol, cresol, xylenol, chlorophenol, ethylphenol and the like. Lactam blocking agent may include gamma-pyrrolidone, laurinlactam, epsilon-caprolactam, delta-valerolactam, gamma-butyrolactam, beta-propiolactam and the like. Oxime blocking agents may include formamidoxime, acetaldoxime, acetoxime, methylethylketoxine, diacetylmonoxime, cyclohexanoxime. Mercaptan blocking agent such as butyl mercaptan, hexyl mercaptan, t-butyl mercaptan, thiophenol, methylthiophenol, ethylthiophenol and the like. Amine blocking agents may include xylidine, aniline, butylamine, dibutylamine, diisopropyl amine, and benzyl-tert-butyl amine.

In some embodiments, the blocked isocyanate is cycloaliphatic polyuretdione, which is a self-blocked isocyanate, i.e., it does not have a separate blocking agent. At a temperature around 350° F. (176° C.), such self-blocked compound falls apart to unblock and release free isocyanate groups as depicted below:

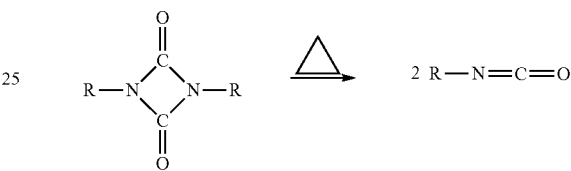

where R is as defined previously.

Thermoset Resins

Epoxy resins for the surface treatment layer include multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)-methane), fluorine 4,4'-dihydroxy benzophenone, bisphenol Z (4,4'-cyclohexylidene-bisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resins) available from Dow Chemical Co.; triglycidyl ethers of aminophenol, e.g. ARALDITE® MY 0510, MY 0500, MY 0600, MY 0610 from Huntsman Corporation. Additional examples include phenol-based novolac epoxy resins, commercially available as DEN 428, DEN 431, DEN 438, DEN 439, and DEN 485 from Dow Chemical Co.; cresol-based novolac epoxy resins commercially available as ECN 1235, ECN 1273, and ECN 1299 from Ciba-Geigy Corp.; hydrocarbon novolac epoxy resins commercially available as TACTIX 71756, TACTIX®556, and TACTIX®756 from Huntsman Corporation.

In the embodiments that use surface resin film for surface treatment, the resin film may be formed by coating a resin composition onto a removable carrier, e.g. release paper, using conventional film coating processes. The wet resin film is then allowed to dry. Subsequently, the resin film is placed onto a surface of a composite substrate, and the carrier is removed.

In the embodiments that use resin-containing peel ply for surface treatment, the peel ply may be formed by coating the resin composition onto the woven fabric so as to completely impregnate the yarns in the fabric using conventional solvent or hot-melt coating processes. The wet peel ply is then allowed to dry to reduce the volatile content, preferably, to less than 2% by weight. Drying may be done by air drying at room temperature overnight followed by oven drying at about 140° F. (60° C.) to about 170° F. (76.7° C.), or by oven drying at elevated temperature as necessary to reduce the drying time. Subsequently, the dried peel ply may be protected by applying removable release papers or synthetic films (e.g. polyester films) on opposite sides. Such release papers or synthetic films are to be removed prior to using the peel ply for surface treatment.

Composite Substrates

Composite substrates in this context refer to fiber-reinforced resin composites, including prepregs or prepreg layups (such as those used for making aerospace composite structures). The term "prepreg" as used herein refers to a layer of fibrous material (e.g. unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or continuous unidirectional fibers. "Unidirectional fibers" as used herein refers to a layer of reinforcement fibers that are aligned in the same direction. The term "prepreg layup" as used herein refers to a plurality of prepreg plies that have been laid up in a stacking arrangement. As example, the number of prepreg plies may be 2 to 100 plies, or 10 to 50 plies.

The layup of prepreg plies may be done manually or by an automated process such as Automated Tape Laying (ATL). The prepreg plies within the layup may be positioned in a selected orientation with respect to one another. For example, prepreg layups may comprise prepreg plies having unidirectional fiber architectures, with the fibers oriented at a selected angle θ, e.g. 0°, 45°, or 90°, with respect to the largest dimension of the layup, such as the length. It should be further understood that, in certain embodiments, the prepregs may have any combination of fiber architectures, such as unidirectionally aligned fibers, multi-directional fibers, and woven fabrics.

Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable or uncured state prior to bonding. Impregnation may be facilitated by the application of heat and/or pressure.

As an example, the impregnating method may include:
(1) Continuously moving a layer of fibers (e.g., in the form of unidirectional fibers or a fabric web) through a (heated) bath of molten impregnating matrix resin composition to fully or substantially fully wet out the fibers; or
(2) Pressing top and bottom resin films against a layer of fibers (e.g., in the form of continuous, unidirectional fibers arranged in parallel or a fabric ply).

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof.

For the fabrication of high-strength composite materials, such as those for aerospace and automative applications, it is preferred that the reinforcing fibers have a tensile strength of greater than 3500 MPa.

Generally, the matrix resin of the composite substrates contain one or more epoxy resins, one or more curing agents, accelerators or catalysts that function to increase the rate of reaction between the thermoset resin and the curing agent, tougheners, fillers, etc.

Adhesive

The adhesive for bonding composite substrates is a curable composition suitable for co-curing with uncured or curable composite substrates. The curable adhesive composition may comprise one or more epoxy resins, curing agent(s) and/or catalyst(s), and optionally, toughening agents, fillers, flow control agents, dyes, etc. The epoxy resins that may be used for the curable adhesive composition include multifunctional epoxy resins having a plurality of epoxy groups per molecule, such as those disclosed for the surface treatment layer.

The curing agents may include, for example, guanidines (including substituted guanidines), ureas (including substituted ureas), melamine resins, guanamine, amines (including primary and secondary amines, aliphatic and aromatic amines), amides, anhydrides, and mixtures thereof. Particularly suitable are latent amine-based curing agents, which can be activated at a temperature greater than 160° F. (71° C.), or greater than 200° F., e.g. 350° F. Examples of suitable latent amine-based curing agents include dicyandiamide (DICY), guanamine, guanidine, aminoguanidine, and derivatives thereof. A particularly suitable latent amine-based curing agent is dicyandiamide (DICY).

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis (dimethyl urea). As an example, dicyandiamide (DICY) may be used in combination with a substituted bisurea as a curing accelerator.

Toughening agents may include thermoplastic and elastomeric polymers, and polymeric particles such as core-shell rubber (CSR) particles. Suitable thermoplastic polymers include polyarylsulphones with or without reactive functional groups. An example of polyarylsulphone with functional groups include, e.g. polyethersulfone-polyetherethersulfone (PES-PEES) copolymer with terminal amine functional groups. Suitable elastomeric polymers include carboxyl-terminated butadiene nitrile polymer (CTBN) and amine-terminated butadiene acrylonitrile (ATBN) elastomer. Examples of CSR particles include those commercially available under the trademark Kane Ace®, such as MX 120, MX 125, and MX 156 (all containing 25 wt. % CSR particles dispersed in liquid Bisphenol A epoxy).

Inorganic fillers may be in particulate form, e.g. powder, flakes, and may be selected from fumed silica quartz powder, alumina, mica, talc and clay (e.g., kaolin).

EXAMPLE

A surface treatment layer may be prepared according the formulation shown in Table 1.

TABLE 1

| Components | Parts (by weight) |
| --- | --- |
| Diglycidyl Ether of Bisphenol A | 50 |
| Triglycidyl Ether of Aminophenol | 25 |
| Dicyclopentadiene-Based Novolac Epoxy Resin | 10 |
| ε-caprolactam blocked isocyanurate (based on isophorone diisocyanate or IPDI) | 146 |
| Fumed Silica | 2 |

The ε-caprolactam blocked isocyanurate could be substituted for any other blocked isocyanate.

What is claimed is:

1. A method for surface preparation prior to adhesive bonding comprising:
   (a) providing a composite substrate comprising reinforcing fibers impregnated with a curable matrix resin, said curable matrix resin comprising one or more epoxy resins and a curing agent;
   (b) applying a surface treatment layer onto a surface of the composite substrate, said surface treatment layer comprising one or more epoxy resins and blocked isocyanate compounds;
   (c) co-curing the composite substrate and the surface treatment layer at an elevated temperature for a time period to unblock some, but not all, of the blocked isocyanate compounds,
   wherein the blocked isocyanate compounds are non-reactive at 20° C.-25° C.

2. The method of claim 1, wherein the surface treatment layer is a resin film which does not comprise a fabric or reinforcement fibers embedded therein.

3. The method of claim 1, wherein the surface treatment layer comprises a woven fabric embedded therein, and
   the method further comprising, after co-curing at (c), removing most of the surface treatment layer from the composite substrate's surface, leaving behind a thin film of thermoset material containing blocked isocyanate compounds on the composite substrate's surface.

4. The method according to claim 1, wherein the blocked isocyanate compounds are polyisocyanates having at least two free isocyanate groups per molecule, where the isocyanate groups are blocked with an isocyanate blocking agent.

5. The method of claim 4, wherein the isocyanate blocking agent is a malonate, triazole, imidazole, pyrazole, phenol, lactam, oxime, mercaptan, or aromatic amine.

6. The method according to claim 1, wherein the blocked isocyanate compounds are compounds of cycloaliphatic polyuretdione.

7. The method according to claim 1, wherein co-curing at (c) is carried out at a first cure temperature in the range of 325° F. to 365° F. (or 162° C. to 185° C.) for a duration of 30 minutes to 4 hours.

8. The method according to claim 1, wherein the first composite substrate is fully cured or partially cured after co-curing at (c).

9. A bonding method comprising:
   (a) providing a first composite substrate comprising reinforcing fibers impregnated with a first curable matrix resin, said first curable matrix resin comprising one or more epoxy resins and a curing agent;
   (b) applying a surface treatment layer onto a surface of the first composite substrate, said surface treatment layer comprising one or more epoxy resins and blocked isocyanate compounds, wherein the blocked isocyanate compounds are non-reactive at 20° C.-25° C.;
   (c) co-curing the first composite substrate and the surface treatment layer at an elevated temperature for a time period to unblock some, but not all, of the blocked isocyanate compounds, wherein the first composite substrate is fully cured or partially cured after co-curing,
   (d) joining the fully cured or partially cured first composite substrate having the surface treatment layer thereon to a second composite substrate with a curable adhesive film in between the composite substrates and the surface treatment layer adjacent to the curable adhesive film, and
   (e) curing the joined composite substrates to form a covalently bonded structure, wherein the blocked isocynate compounds in the surface treatment layer become unblocked during curing at (e).

10. The bonding method according to claim 9, wherein co-curing at (c) is carried out at a first cure temperature in the range of 325° F. to 365° F. (or 162° C. to 185° C.) for a duration of 30 minutes to 4 hours.

11. The bonding method of claim 10, wherein curing at (e) is carried out at the same first cure temperature as the temperature for co-curing at (c).

12. The bonding method of claim 10, wherein curing at (e) is carried out at a temperature that is higher than the first cure temperature for co-curing at (c).

13. The bonding method according to claim 12, wherein curing at (e) is carried out at a temperature in the range of 325° F. to 365° F. (or 162° C. to 185° C.).

14. The bonding method according to claim 9, wherein curing at (e) is carried out for 1 to 3 hours.

15. The bonding method of claim 9, wherein the second composite substrate comprises reinforcement fibers impregnated with a second curable matrix resin comprising one or more epoxy resins and a curing agent, and the second composite substrate is uncured or partially cured prior to being joined to the first composite substrate.

16. The bonding method according to claim 9, wherein the curable adhesive film comprises at least one multifunctional epoxy resin and at least one amine compound as a curing agent.

17. A bonding method comprising:
   (a) providing a first composite substrate comprising reinforcing fibers impregnated with a first curable curable resin, said first curable matrix resin comprising one or more epoxy resins and a curing agent;
(b) applying a curable peel ply onto a surface of the first composite substrate, said peel ply comprising a woven fabric embedded in a second curable resin, wherein the second curable resin comprises one or more epoxy resins and blocked isocyanate compounds;
(c) co-curing the first composite substrate and the peel ply at an elevated temperature for a time period to unblock some, but not all, of the blocked isocyanate compounds, wherein the second curable resin is partially cured after co-curing;
(d) removing most of the peel ply, including the woven fabric therein, from the first composite substrate, leaving behind a remaining film of partially cured thermoset material comprising blocked isocyanate compounds on the first composite substrate;
(e) joining the first composite substrate to a second composite substrate with a curable adhesive film in between the composite substrates, wherein the remaining film of partially cured thermoset material is adjacent to the curable adhesive film, and
(f) curing the joined composite substrates to form a covalently bonded structure, wherein the blocked isocyanate compounds in the remaining film of partially cured thermoset material become unblocked during curing at (f).

18. The bonding method according to claim 17, wherein the second composite substrate comprises reinforcement fibers impregnated with a second curable matrix resin comprising one or more epoxy resins and a curing agent.

19. The bonding method according to claim 17, wherein the second composite substrate is uncured or partially cured prior to being joined to the first composite substrate.

20. The bonding method according to claim 17, wherein the curable adhesive film comprises at least one multifunctional epoxy resin and at least one amine compound as a curing agent.

* * * * *